United States Patent
Agombar et al.

(10) Patent No.: US 10,067,874 B2
(45) Date of Patent: Sep. 4, 2018

(54) OPTIMIZING THE MANAGEMENT OF CACHE MEMORY

(71) Applicant: INTERNATIONAL BUSINESS MACHINES CORPORATION, Armonk, NY (US)

(72) Inventors: John P. Agombar, Hampshire (GB); Ian Boden, Hampshire (GB); Gordon D. Hutchison, Hants (GB); Lee J. Sanders, West Sussex (GB)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 15/175,973

(22) Filed: Jun. 7, 2016

(65) Prior Publication Data
US 2017/0351615 A1    Dec. 7, 2017

(51) Int. Cl.
*G06F 12/0871* (2016.01)
*G06F 12/0831* (2016.01)

(52) U.S. Cl.
CPC ...... *G06F 12/0871* (2013.01); *G06F 12/0831* (2013.01); *G06F 2212/6042* (2013.01); *G06F 2212/621* (2013.01)

(58) Field of Classification Search
CPC ............ G06F 12/0871; G06F 12/0831; G06F 12/0808; G06F 12/0837; G06F 12/0868; G06F 12/0888; G06F 2212/621; G06F 2212/6042; G06F 2212/1041; G06F 2212/6024

See application file for complete search history.

(56) References Cited

U.S. PATENT DOCUMENTS

| 8,589,924 | B1* | 11/2013 | Johnsen | G06F 9/505 718/100 |
| 8,996,480 | B2 | 3/2015 | Agarwala et al. | |
| 2014/0366155 | A1 | 12/2014 | Chang et al. | |
| 2015/0113224 | A1* | 4/2015 | Achilles | G06F 12/0891 711/135 |
| 2015/0161159 | A1 | 6/2015 | Provenzano et al. | |

(Continued)

OTHER PUBLICATIONS

Takata et al., "Event-notification-based Inactive File Search for Large-scale File systems", APMRC 2012 Digest, Oct. 31-Nov. 2, 2012, pp. 1-7.

(Continued)

*Primary Examiner* — Michael Krofcheck
(74) *Attorney, Agent, or Firm* — Erik K. Johnson

(57) ABSTRACT

It is determined that a cache operation relating to the transfer of data between a cache memory and a data storage system is required. A state of a utilization model is received, the utilization model including requirements for utilization of resources of the data storage system over a time period, and the state indicating a cost of resource utilization associated with cache operations in the current time period. It is determined whether to perform the cache operation, based on the utilization requirements and the state of a utilization model. If the cache operation is not to be performed, and if the cache operation is a write operation, it is determined whether the cache memory is full. If so, the cache operation is managed according to an emergency cache management process; if not, the data associated with the cache operation is maintained in the cache memory.

13 Claims, 5 Drawing Sheets

(56) References Cited

U.S. PATENT DOCUMENTS

2015/0227602 A1    8/2015  Ramu et al.
2015/0286438 A1*  10/2015  Simionescu ........ G06F 12/0866
                                                          711/103
2015/0363275 A1   12/2015  Bernal et al.
2017/0115894 A1*   4/2017  Sterns .................. G06F 3/0613

OTHER PUBLICATIONS

Papaioannou et al., "Scalia: An Adaptive Scheme for Efficient Multi-Cloud Storage", IEEE, Nov. 10-16, 2012, pp. 1-10.
Amazon Simple Storage Service (S3)—AWS, "Amazon S3 Pricing", Cloud Storage Pricing, Printed on May 26, 2016, pp. 1-8.
Mell et al., "The NIST Definition of Cloud Computing", National Institute of Standards and Technology, Special Publication 800-145, Sep. 2011, pp. 1-7.

* cited by examiner

OPTIMIZING THE MANAGEMENT OF CACHE MEMORY

BACKGROUND

The present invention relates generally to the management of cache memory, and more specifically, to optimizing the management of a cache memory associated with data storage appliances and the like.

SUMMARY

Embodiments of the present invention disclose a computer-implemented method, computer program product, and system. It is determined that a cache operation relating to the transfer of data between a cache memory and a data storage system is required. A current state of a utilization model is received. The utilization model includes requirements for utilization of resources of the data storage system over a predefined time period. The current state of the utilization model indicates a current cost of resource utilization associated with cache operations in a current predefined time period. Based on the utilization requirements and the current state of a utilization model, it is determined whether to perform the cache operation. In response to determining that the cache operation should be performed, the cache operation is performed. In response to determining that the cache operation should not be performed, if the cache operation is a cache write operation, it is determined whether the cache memory is full. If not, the data associated with the cache operation is maintained in the cache memory. If the cache memory is full, the cache operation is managed according to an emergency cache management process.

DETAILED DESCRIPTION

Figure 1:
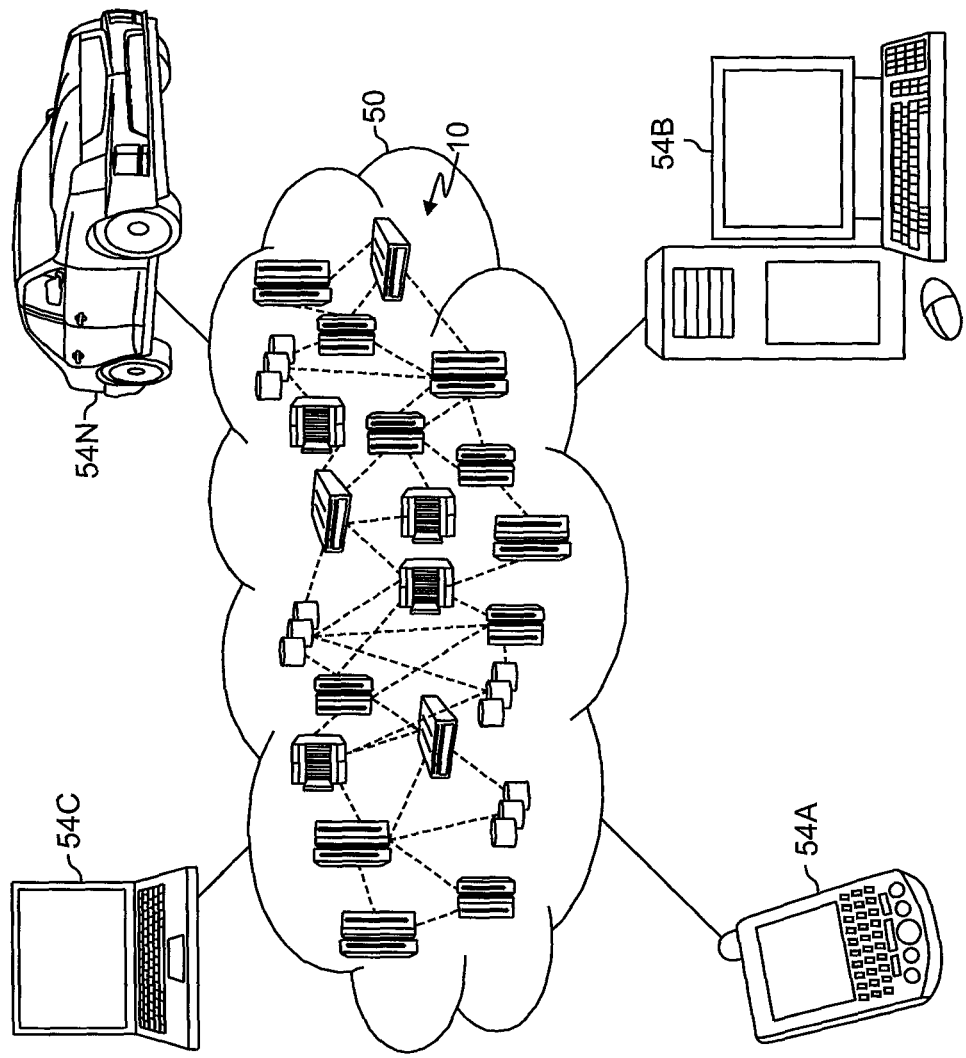
FIG. 1 depicts a cloud computing environment, in accordance with an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local grid management systems used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local grid management system. It is understood that the types of grid management systems 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
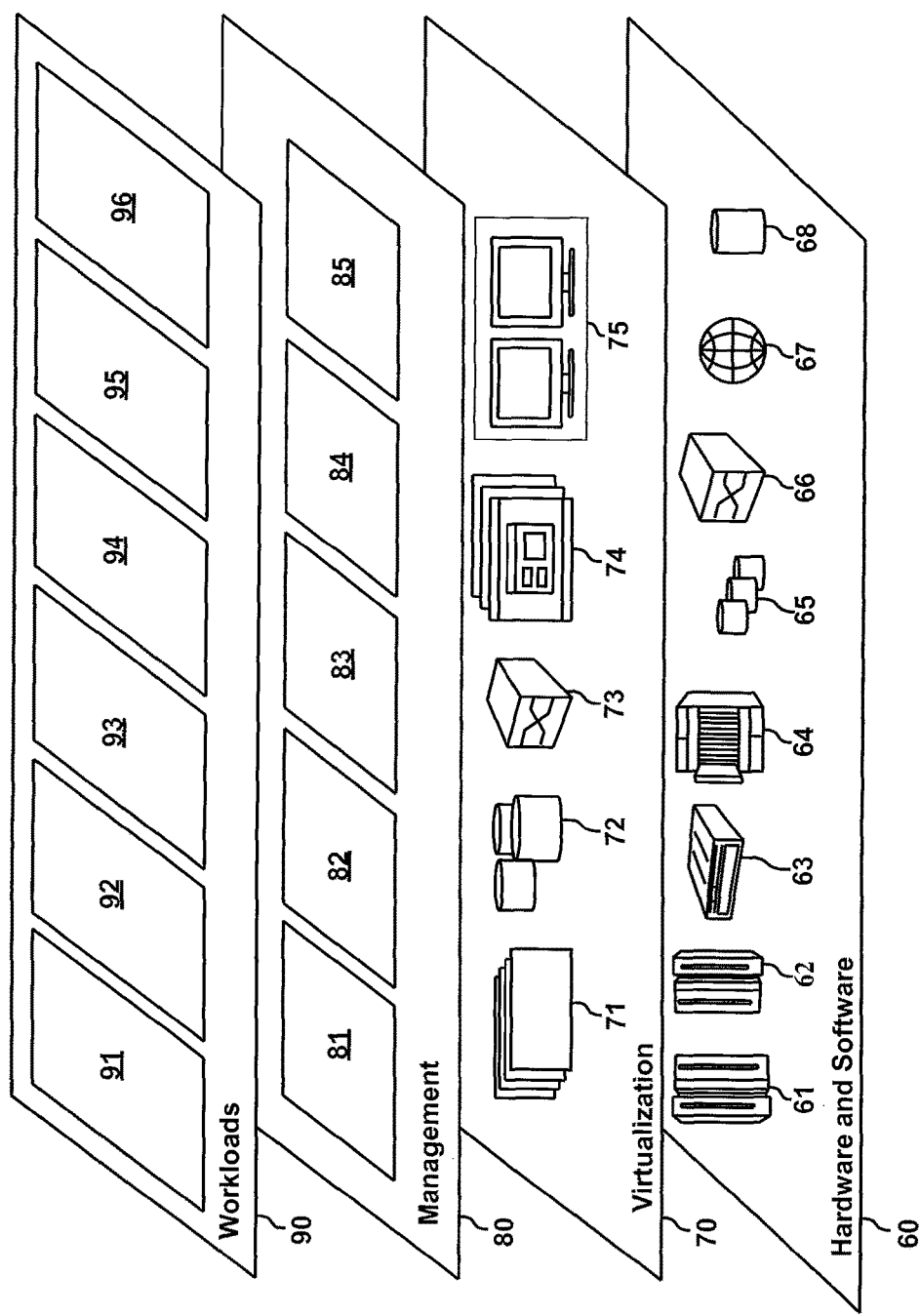
FIG. 2 depicts abstraction model layers, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other workload programs 96.

Embodiments of the present invention disclose a computer-implemented method, computer program product, and system for management of cache memory including data stored in a cloud environment, as discussed above. The disclosed example implementations may be used for managing data storage in a cache appliance for a consumer's enterprise network in order to optimize the utilization of computing resources, as described in further detail below. In the drawings, the same or similar features are assigned the same or similar reference numerals.

Figure 3:
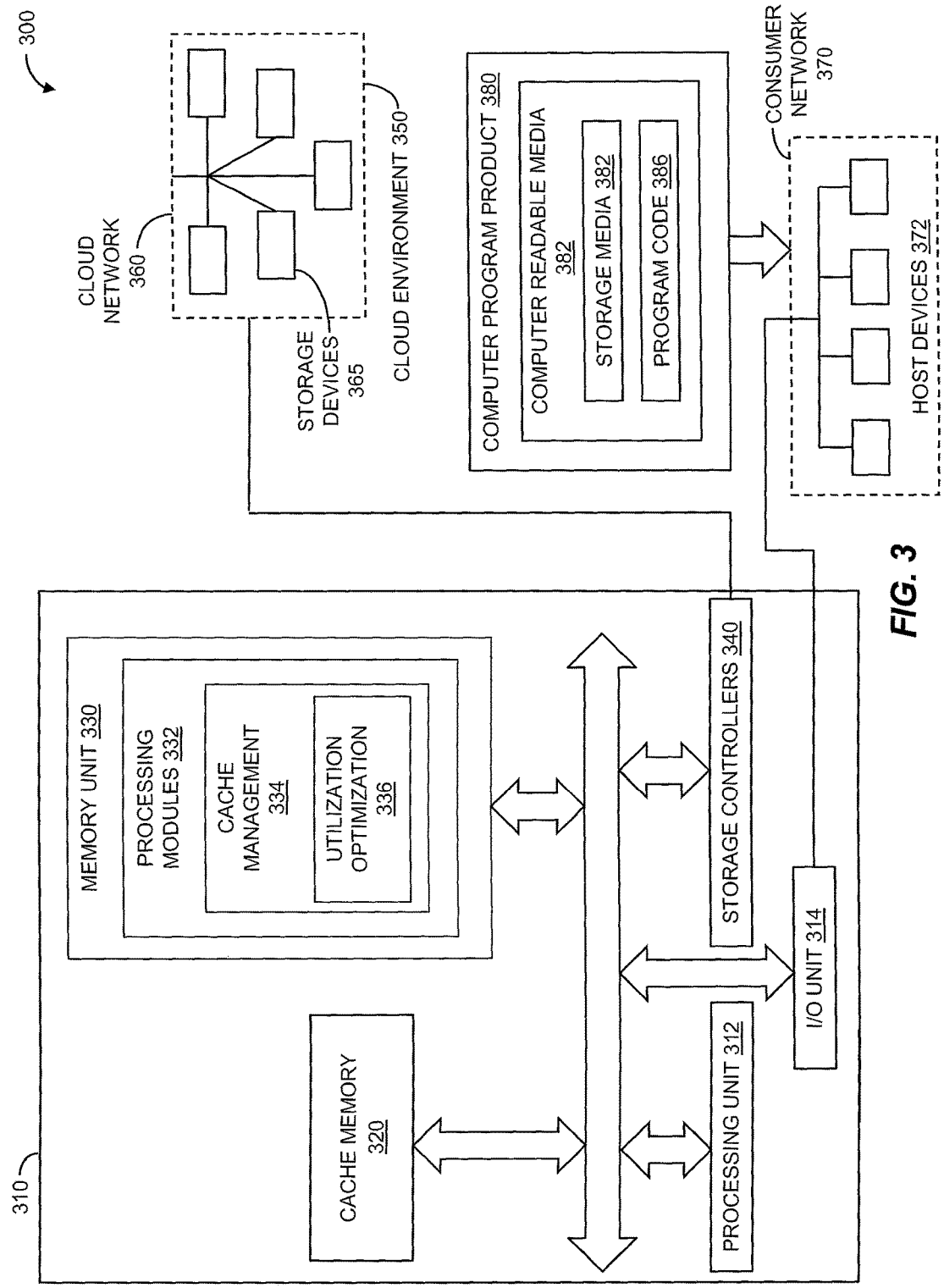
FIG. 3 is a functional block diagram illustrating a system for cache management, in accordance with an embodiment of the present invention.

FIG. 3 is a block diagram showing a system 300 according to an example implementation of the present disclosure. The system 300 comprises a cache apparatus or cache appliance 310 for storing cached data from storage devices 365 on a cloud network 360 of a cloud environment 350. In example implementations of the present disclosure, cache appliance 310 comprises a so-called "Cloud Storage Gateway", which may be located at a consumer's premises on a consumer network 370 and, thus, provide the consumer with a local storage facility for fast and convenient retrieval of its data for use by computing devices and applications on the consumer network 370. As a person skilled in the art will appreciate, cache appliance 310 may be any other suitable cache apparatus and may be provided at any suitable location on the consumer network 370, the cloud network 360 of the cloud environment 350 or any other associated network.

Cache appliance 310 includes cache memory 320 for storing (i.e., caching) data and a plurality of storage controllers 340, which control the storage of cached data at locations in cache memory 320 to and from a plurality of data storage devices 365 in the cloud environment 350. Cache appliance 310 further includes a memory unit 330 for storing processing modules 332 associated with the appliance 310, a processing unit 312 for processing data, and, in particular, for executing program code of the processing modules 332, and an input output (I/O) unit 314 for providing data to and from host devices 372 running host applications on the consumer network 370.

In accordance with example implementations of the present disclosure, memory unit 330 includes a cache management module 334 for managing operations of the cache appliance 310, and, in particular, for managing the storage of data in cache memory 320. In example implementations, cache management module 334 manages cache operations associated with cache memory 320. Cache operations may comprise data transfer operations including: i) writing data from cache memory to cloud storage (i.e., "destage" operations); ii) removing data from the cache memory (i.e., "eviction" operations), iii) reading data into cache memory from cloud storage (i.e., "stage" operations), and iv) predictively reading data into cache memory from cloud storage (i.e., "prefetch" operations).

Cache management module 334 may use conventional methods for managing cache memory 320. In particular, at any given time, cache management techniques may aim to maximize the amount of data stored in cache memory required by host applications, so as to avoid so called "cache misses", which lead to retrieval of the required data from cloud storage, and thus introduce latency in the time to retrieve data for use by the host applications. At the same time, cache management techniques aim to ensure that, at any given time, data not immediately required by host applications is not retained in cache memory, so as to maximize the availability of storage capacity for more relevant data. For example, a conventional cache management technique may perform processing to identify that a cache operation is required and the associated data that should be selected for transfer. For example, a destage and/or eviction operation may be required to make additional cache storage capacity available (e.g., to comply with normal cache requirements). A typical destage and/or eviction algorithm may use an LRU (least recently used) scheme, whereby the oldest data stored in a LRU portion of cache memory is selected for eviction from the cache. As the skilled person will appreciate, data stored in a LRU portion of cache memory has not been accessed for a period of time, in contrast to data stored in a MRU (most recently used) portion of cache memory, which has been recently accessed. Thus, conventional cache management techniques implement a destage and/or eviction algorithm that selects data from an LRU portion of the cache, since the likelihood of that data being accessed again is diminished.

In addition to the above described cache management techniques, in example implementations of the present disclosure that include a cloud storage gateway or similar appliance 310, cache management module 334 may perform additional operations such as data compression, de-duplication and other methods for increasing utilization of storage capacity within cache memory. In this way, conventional cache management techniques aim to optimize the utilization of storage capacity in cache memory 320, in order to improve cache performance.

In accordance with example implementations of the present disclosure, cache management module 334 includes a resource utilization optimization module 336 (for simplicity called "utilization optimization module" herein), as shown in FIG. 3. Thus, in addition to the above cache management techniques that may be performed by cache management module 334, which are solely or primarily based on optimizing the utilization of storage space in cache memory, utilization optimization module 336 may perform cache management techniques further based on optimizing the utilization of other computing resources within the wider computing system where the data is stored, including the use of computing resources of a hardware and software functional abstraction layer 60 of a cloud computing environment 50 as described above with reference to FIG. 2. In example implementations of the present disclosure, utilization optimization module 336 may perform cache management techniques based on optimizing the utilization of computing resources associated with cloud storage devices 365 and cloud network 360 of cloud environment 350 described above with reference to FIG. 3. Such computing resources include networks, network bandwidth, processing, memory and storage of cloud environment 350. In the following description, the computing resources associated with a data storage system, such as a cloud storage environment, are referred to as "computing resources" or simply "resources".

In example implementations of the present disclosure, a computer program product 380 may be provided, as shown in FIG. 3. The computer program product 380 may include a computer readable media 382 having storage media 384 and program instructions 386 (i.e., program code) embodied therewith. The program instructions 386 may be loaded onto a memory unit 330 of cache appliance 310 via I/O unit 314. The program instructions 386 may comprise the above-described utilization optimization module 336 of cache management module 334. The program instructions 386 may be executable by the processing unit 312 of the cache appliance 310 to perform cache management processing as described below with reference to FIGS. 4 and 5.

Figure 4:
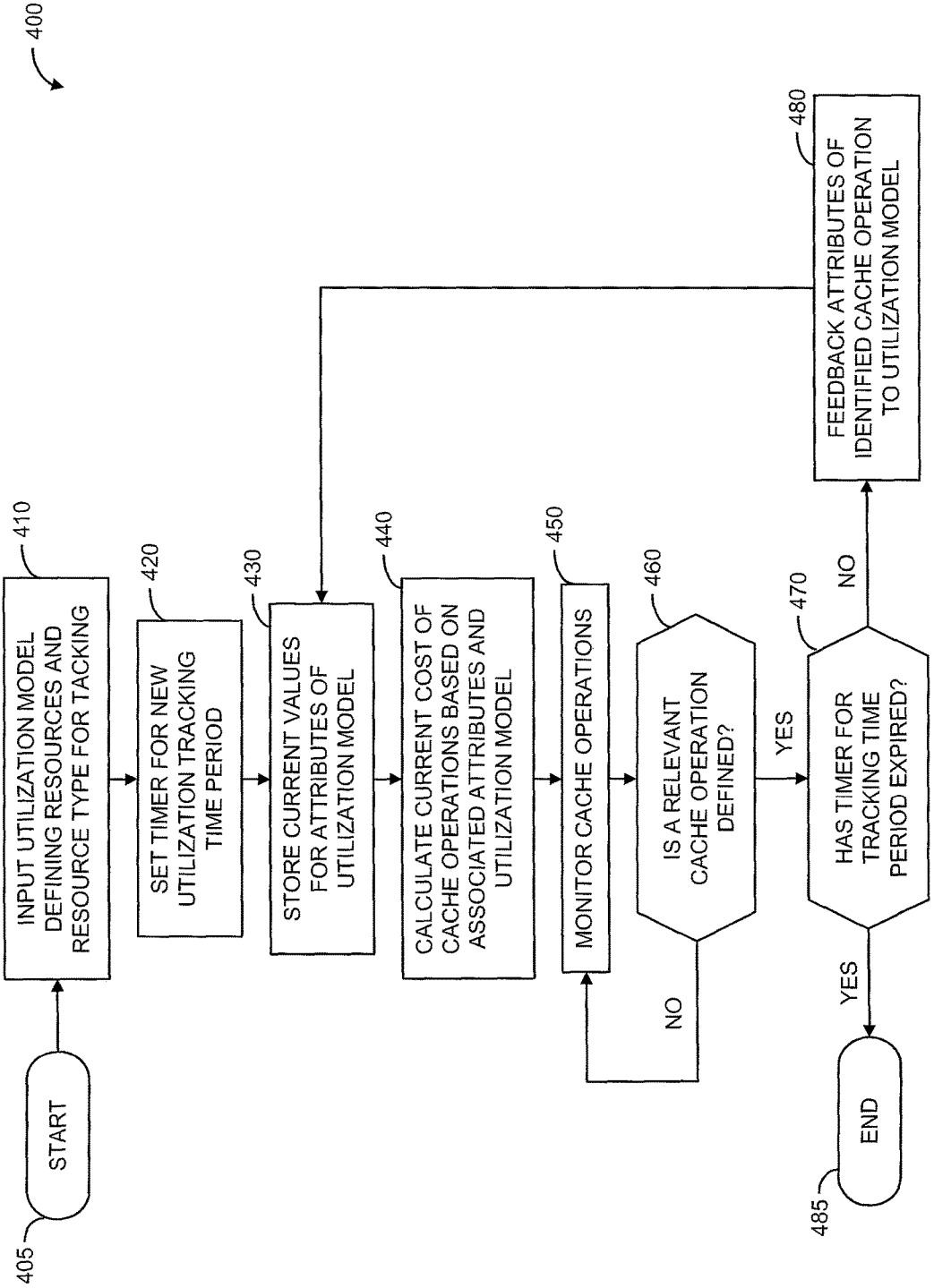
FIG. 4 is a flowchart depicting operational steps in a method for tracking resource utilization for cache management, in accordance with an embodiment of the present invention.

FIG. 4 is a flowchart illustrating a method 400 for tracking the utilization of computing resources for cache management according to an example implementation of the present disclosure. In particular, although not exclusively, at least part of the method may be performed by the utilization optimization module 336 of the cache management module 334 of a cache appliance 310, as shown in FIG. 3. As described below, the method maintains and updates a model for the utilization of computing resources over a predefined time period, by monitoring cache operations and updating the state of the utilization model using feedback information from the tracked cache operations and associated attributes.

The method 400 starts at step 405. At step 410, the method receives an input utilization model relating to the utilization of computing resources associated with cache operations for cache management. In particular, the utilization model may define a number of attributes, including attributes relating to utilization of computing resources (or resource types) associated with cache operations, for tracking over a predefined time period. In addition, the utilization model may define requirements, such as thresholds associated with one or more of the attributes of the utilization model, over a particular predefined time period. Whether to perform a cache operation may depend on a comparison with these thresholds. As described in example utilization models below, such requirements may be set by a vendor in predefined standard utilization models or may be defined or modified by the consumer in a model specification, for example, based on a resource utilization policy specification, as desired.

Thus, in example implementations of the present disclosure, a threshold may be set for: a) a number of cache operations that use a resource or resource type; b) an amount of data associated with cache operations that use a resource or resource type, or c) a data rate associated with cache operations that use a resource or resource type, for a predefined time period. For example, a cache destage operation over cloud network 360 to a particular storage device 365 (or type of storage device) in the cloud environment 350 may have an associated threshold based on: a) the total number of destage operations, b) the total amount of data written by destage operations, c) the average data rate at which the data is written by destage operations, or d) the maximum data rate at which data is written by destage operations, where each of the thresholds a) to d) are set for a predefined time period. As the skilled person will appreciate, thresholds may be defined such that other types of cache operation that use other computing resources in the cloud environment 350, such as cache eviction, cache stage, and cache prefetch operations are performed based on a comparison with these thresholds.

In accordance with example implementations of the present disclosure, the input utilization model defines a number of attributes relating to cache operations and/or associated computing resource utilization, the values of which are tracked in accordance with the utilization model. In particular, the utilization model may maintain cumulative values of attributes, based on observed cache operations over a current time period. For example, the utilization model may maintain and update a cumulative value of the number of cache operations that have been performed during the current time period, and may calculate a corresponding cumulative measure or cost of resource utilization associated with those cache operations. The utilization model may further determine a current measure or cost of resource utilization of individual cache operations, based on current values of associated attributes, which may be updated during the predefined time period. Specific examples of suitable utilization models that may be input at step 410 are described in more detail below.

At step 420, the method sets a timer for a new utilization tracking time period. As indicated above, the input utilization model specifies a predefined time period in relation to its requirements, such as thresholds, for resource utilization. The predefined time period may be any suitable time period including: a data, a week, a month or a quarter (i.e., three months). The method of FIG. 4 subsequently monitors cache operations and tracks attributes relating to computing resource utilization as defined in the utilization model, for the predefined time period. Examples of attributes that are tracked include, for each resource (or resource type): a) the number of cache operations, b) the amount of data associated with cache operations, c) the data rate associated with cache operations. Other attributes may be tracked, as desired, and further examples of such attributes are provided in the example utilization models described below.

At step 430, the method stores a current value for each tracked attribute of the utilization model, which represents the current state of the utilization model. In particular, following step 420, step 430 stores and initial value of the attributes of the utilization model, which are typically predetermined values defined in the utilization model according to the type of attribute. At step 440, the method determines a current cost of resource utilization of cache operations (e.g., cache read or cache write operations). In example implementations, the current cost of resource utilization of cache operations may be determined based on a cumulative measure or cost of cache operations that have been performed during the current time period. In other example implementations, the current cost of resource utilization of cache operations may be determined based on a current measure or cost of individual cache operations. The current cost of resource utilization of cache operations may be determined using methods based on current values of associated attributes and relevant threshold values for the predefined time period. As the skilled person will appreciate, the initial value of an attribute may be determined to be zero at the start of a new tracking time period, which was set at step 420. Nevertheless, as the skilled person will appreciate, some attributes of the utilization model may be set with an initial value greater than zero.

At step 450, the method monitors for cache operations having associated resource utilization for tracking attributes in accordance with the utilization model. At step 460, the method determines whether a relevant cache operation has been identified. If step 460 determines that such a cache operation has not been identified, the method returns to step 450 and continues to monitor for cache operations. However, if step 450 determines that a cache operation has been identified, the method proceeds to step 470.

At step 470, the method determines whether the timer for the tracking time period has expired. If step 470 determines that the timer has not yet expired, the method proceeds to step 480, which provides details of the cache operation as feedback to the utilization model. In particular, the method provides values of attributes associated with the identified cache operation for updating the current state of the utilization model. The method then returns to step 430, which, in response to the feedback at step 470, records updated current values of the attributes and at step 440 determines updated current costs of cache operations, according to the updated utilization model. However, if step 470 determines that the timer has not yet expired, the method ends at step 485. As the skilled person will appreciate, steps 470, 480 and repeat steps 430 and 440 may be performed in any other appropriate order or substantially concurrently.

As the skilled person will appreciate, the method 400 for tracking the utilization of computing resources of FIG. 4 monitors and updates attributes of a utilization model associated with resource utilization of cache operations. Various modifications and changes may be made to the method of FIG. 4, according to design requirements. In addition, the skilled person will appreciate that other suitable methods may be used to track resource utilization by cache operations, for use in cache management for optimizing resource utilization according to example implementations, and such methods are contemplated by the present disclosure. In addition, whilst the method 400 may be performed by a utilization optimization module 336 of a cache management module 334 of a system as shown in FIG. 3, in other example implementations one or more of the steps of the method 400 may be performed by other processing modules, which may be separate from, or form part of, cache management module 334. Moreover, in other example implementations, a part of the method 400 may be performed by Metering and Pricing function 82 of a cloud computing environment, as shown in FIG. 2.

Figure 5:
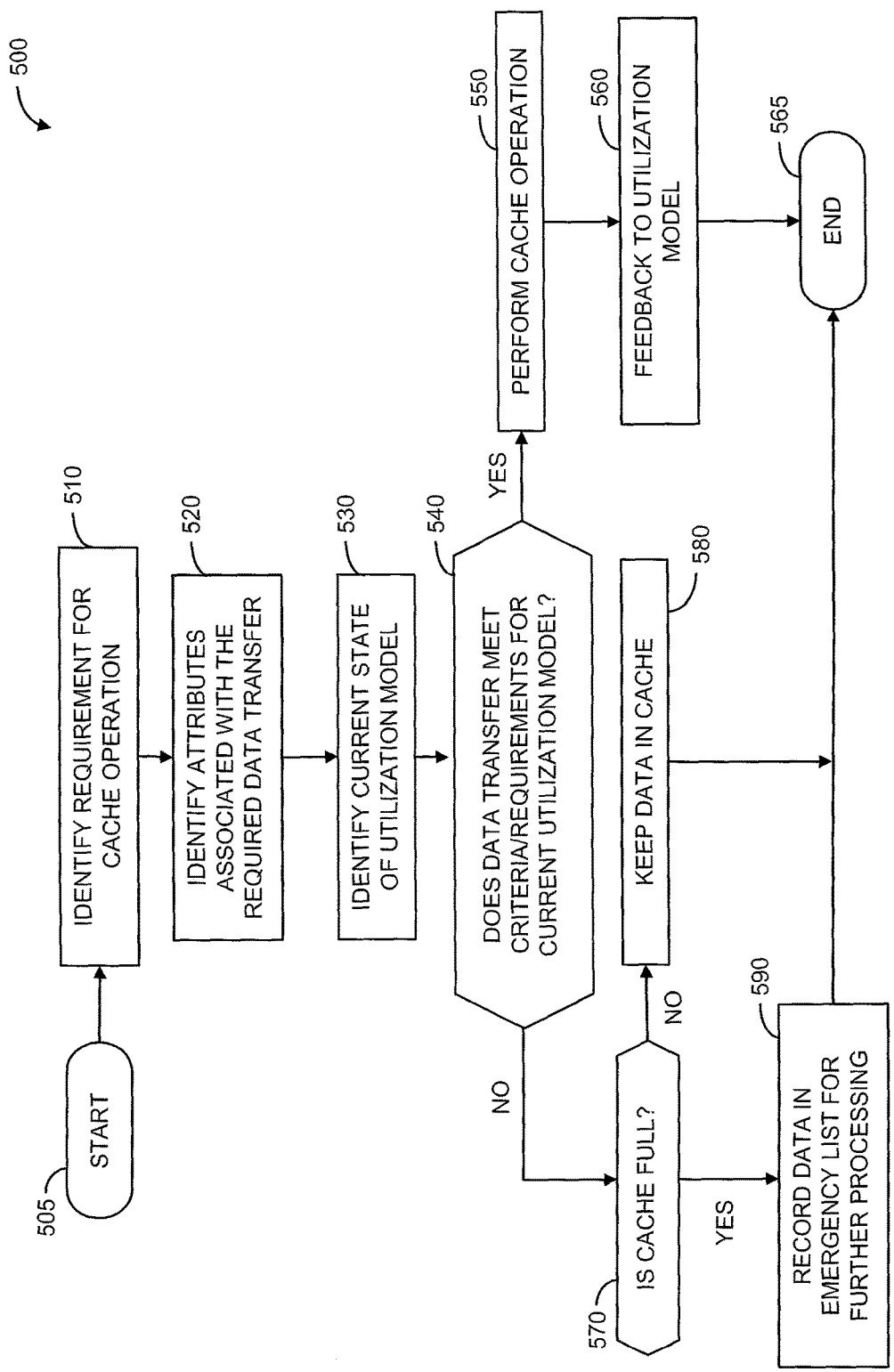
FIG. 5 is a flowchart depicting operational steps performed by a cache management system, in accordance with an embodiment of the present invention.

FIG. 5 is a flowchart illustrating a method 500 for cache management according to an example implementation of the present disclosure. In particular, although not exclusively, the method 500 may be performed by the utilization optimization module 336 of the cache management module 334 of a cache appliance 310, as shown in FIG. 3. The method performs cache management in accordance with a current state of a utilization model, for example a utilization model that is maintained and updated by a method for tracking resource utilization, such as the method of FIG. 4. The method of FIG. 5 may be performed in conjunction with conventional cache management techniques, for example, performed by cache management module 334, as discussed above.

The method 500 starts at step 505. At step 510, the method determines that a cache operation is required. The cache operation may be a cache write operation (e.g., for the transfer of data from cache memory to cloud storage) or a cache read operation (e.g., for the transfer of data to cache memory from cloud storage). In example implementations of the present disclosure, it may be determined that a cache write (e.g., destage) operation or a cache read (e.g., stage or prefetch) operation is required by receiving an indication of the requirement for a respective cache write or cache read operation, for example from a conventional cache management process, as described above. As the skilled person will appreciate, a requirement for a cache read or cache write operation may include an associated eviction operation to remove data. At step 520, the method identifies attributes associated with the required cache operation. The attributes associated with the required cache operation will dependent on the type of cache operation and the utilization model. Examples of such attributes are provided below in relation to the description of example utilization models. At step 530, the method receives the current state of a utilization model for the cache management method 500, or a relevant part thereof. For example, the method may receive data for a current state of the utilization model, including current values for its attributes, stored in steps 430 and 440 of the method of FIG. 4, and the utilization model requirements. In addition, the method may receive algorithms for determining whether to perform a cache operation, based on the type of cache operation and associated utilization requirements At step 540, the method determines whether the required cache operation complies with the utilization model requirements, based on the current state of the utilization model. In example implementations, step 540 may determine whether the required cache operation complies with a predefined threshold for resource utilization associated with the cache operation, based on the values of attributes of the utilization model in its current state. The determination at step 540 may be based one or more values of the attributes of the required cache operation, such as a measure of resource utilization. In addition, or alternatively, the determination at step 540 may be based on the current state of the utilization model, such as the current measure or cost of resource utilization associated with the cache operation and/or the corresponding threshold. Moreover, other values of attributes may be used in the determination at step 540. The methods and algorithms used in step 540 are typically defined by, or dependent upon, the utilization model implemented. Moreover, the methods and algorithms used in step 540 may be dependent upon the type of cache operation. Examples of suitable methods and algorithms are provided below.

If step 540 determines that the required cache operation complies with the utilization model requirements based on the current utilization model, the method proceeds to step 550, in which the cache operation identified at step 510 is performed, for example by transferring data from cache memory to cloud storage or vice versa, in accordance with the required cache operation. In example implementation of the present disclosure, following the cache operation at step 550, optional step 560 may send feedback data to the utilization model, including attributes of the cache operation that has been performed. For instance, step 560 may provide input for the tracking and feedback performed in steps 450, 460 and 470 of the method of FIG. 4. The method then ends at step 565.

However, if step 540 determines that the required cache operation does not comply with the utilization model requirements based on the current utilization model, the method proceeds to step 570 in order to determine whether the data associated with the required cache operation should remain in the cache. In particular, as mentioned above, a cache read or cache write operation may include an eviction operation, in order to free up storage capacity in the cache memory. Thus, at step 570, the method determines whether the cache memory is full. A cache memory may be regarded as full if it has less than a minimum threshold amount of available storage capacity, which may be predefined based on normal cache management requirements. As the skilled person will appreciate, any suitable technique for determining whether there is sufficient available capacity in cache storage may be used for this purpose.

If step 570 determines that the cache memory is not full, then there is sufficient available storage space for normal cache management requirements. Thus, any data to be evicted by the required cache operation may remain stored in the cache memory without adversely impacting cache management. Accordingly, in response to determining that the cache memory is not full at step 570, the method proceeds to step 580 by keeping the data in cache memory (i.e., not performing the required cache operation and any associated cache eviction operation identified at step 510), and the method ends at step 565.

However, if step 570 determines that the cache memory is full, then there is insufficient available storage space for normal cache management requirements. In this case, the method proceeds to step 590 by recording data (or details of data) for eviction associated with the required cache operation identified at step 510, in an emergency list for further processing in accordance with conventional cache management processes. As the skilled person will appreciate, in other example implementations, step 590 may perform any other suitable steps for initiating an emergency cache management process appropriate to the particular application. The method then ends at step 565.

As the skilled person will appreciate, the method of FIG. 5 manages required cache operations, in which data is written from cache memory to cloud data storage or vice versa, in accordance with of a utilization model associated with resource utilization of cache operations. Various modifications and changes may be made to the method of FIG. 5, according to design requirements. In particular, in example implementations, step 570 of determining whether the cache is full may be performed prior to step 540 of determining whether the cache operation complies with the utilization model.

As indicated above, example implementations of the present disclosure provide a utilization model for cache management, which augments conventional mechanisms for cache management that solely or primarily optimize the utilization of cache storage, and cache performance, in order to minimize latency for host applications. In particular, the utilization model may additionally optimize the utilization of computing resources of the associated data storage system, such as computing resources of a cloud environment in which cached data is stored. In example implementations of the present disclosure, as described below, the utilization model determines a current measure or cost of resource utilization associated with cache operations based on the values of attributes, and includes user-defined requirements for resource utilization, such as a maximum threshold for a cumulative measure or cost of resource utilization over a predefined time period. Thus, a current cost of resource utilization associated with a cache operation may be used, together with a requirement (e.g., threshold) and other related attributes, to determine whether or not a required cache operation should be performed at a particular time. In this way, the utilization of computing resources of the data storage system as a whole can be optimized, as required by the consumer, over a predefined time period.

The utilization model may be used in conjunction with any conventional cache management technique as described above. However, the utilization model need not be used in conjunction with cache management techniques used in emergency cases, such as the handling of data in the event of power loss, since potential loss of data would significant outweigh any benefit from optimizing resource utilization.

As described above in relation to the method 400 of FIG. 4, cache operations may be tracked over a predefined time period. Tracking may be based on a particular resource or type of resource of the data storage system, the utilization of which the consumer seeks to control during the predefined time period in order to optimize system utilization. For example, tracking may be performed on a per virtualized storage pool, per host volume or per backend volume basis. In example implementations of the present disclosure, a measure or cost of resource utilization associated with a cache operation, for a particular resource or resource type, may be determined based on a corresponding charge made by a cloud service provider under a cloud service charging scheme of a Service Level Agreement (SLA). For example, a charging scheme may charge for use based on a per read/write operation, per data quantity (e.g., in Mb) transferred (e.g., destaged) or based on the data rate of the data transfer to/from the cloud environment.

Example Utilization Models

Example utilization models may comprise one or more of the attributes as set out in Table 1, below, for each resource (or resource type) associated with the cloud environment:

TABLE 1

EXAMPLE UTILIZATION MODEL ATTRIBUTES

| | ATTRIBUTE DESCRIPTION | PSEUDOCODE NAME |
|---|---|---|
| 1 | Utilization model for the resource | (model) |
| 2 | Total number of reads and writes issued to the resource | (tot_reads, tot_writes) |
| 3 | Amount of data read or written on the resource | (tot_data_read, tot_data_write) |
| 4 | Total amount of data currently stored on the resource | (tot_data_stored) |
| 5 | Location of the resource | (location) |
| 6 | Number of reads and writes to the resource in the user defined time period | (num_reads_period, num_writes_period) |
| 7 | Amount of data read or written to the resource in the user defined time period | (data_read_period, data_write_period) |
| 8 | Regions of the resource where data is overwritten in the user defined time period | (write bitmap) |
| 9 | Regions of the resource where data is frequently being written in the user defined time period | (proximity write bitmap) |
| 10 | Regions of the resource where data is frequently read in the user defined time period | (read bitmap) |
| 11 | Regions of the resource where data is frequently being read in the user defined time period | (proximity read bitmap) |
| 12 | Write destage/eviction rate to the resource | (write rate) |
| 13 | Read stage/prefetch rate from the resource | (read rate) |
| 14 | Current cost of read requests to the resource | (read cost) |
| 15 | Current cost of write requests to the resource | (write cost) |
| 16 | Total cost of read requests to the resource | (tot_cost_read) |
| 17 | Total cost of write requests to the resource | (tot_cost_write) |

The attributes in Table 1, and any other suitable attributes, may be tracked and stored in the utilization model, for example using the method of FIG. 4. In addition, one or more corresponding attributes may be identified for a required cache operation, for example in step 520 of the method of FIG. 5. For example, a required cache operation may have an attribute data_read or data_write corresponding to the amount of data read or written by the cache operation, and location corresponding to the location of the resource or resource type from which data is to be read or to which data is to be written by the cache operation. Values of attributes defined in the utilization model, associated with the resource or resource type involved in the cache operation, may also be identified in step 520 of the method of FIG. 5 for a required cache operation.

Example utilization models may determine, for a resource or resource type, a current cost or value associated with cache write operations (e.g., as the attribute write cost) and cache read operations (e.g., as the attribute read cost). The following example utilization models consider two types of required cache write operation: 1) cache destage (write) operation, and 2) cache eviction (write and remove) operation, over the predefined time period as the attribute write cost. For example, the write cost attribute may be determined at step 440 of the method 400 of FIG. 4. In one example model, the write cost attribute for a required cache write operation is determined using a method or algorithm based on the amount of data written by the required cache write operation, (e.g., using the attributes data_write and/or tot_data_write), where the amount of data is defined as the data volume occupied by the data transferred on the cloud (i.e., a LUN). In other words, cost is tracked at a LUN level. As the skilled person will appreciate, in other examples, a cost may be tracked based on an amount of data at a pool level, consistency group level or host level. In other examples, the write cost attribute for a required cache write operation may be determined using a method or algorithm based on the number of cache write operations (e.g., using the attributes tot_writes and/or num_writes_period) or based on the data rate of the required cache write operation (e.g., using the attribute write rate). As the skilled person will further appreciate, the method or algorithm for determining the write cost attribute for a required cache write operation may use any one or more of the attributes set out in Table 1 or any other attributes tracked by the utilization model.

In addition, the skilled person will appreciate that for cache read operations, the read cost attribute may be determined at step 440 of the method 400 of FIG. 4. In particular, the read cost attribute may be determined using equivalent methods and algorithms to those for the write cost attribute set out above. For example, the read cost attribute may be determined based on: the amount of data read by the required read operation (e.g., using the attributes data_read and/or tot_data_read); the number of read operations (e.g., using the attributes tot_reads and/or num_reads_period), or the data rate of the required read operation (e.g., using the attribute read rate). As the skilled person will appreciate, the method or algorithm for determining the read cost attribute for a required cache read operation may use any one or more of the attributes set out in Table 1 or any other attributes tracked by the utilization model.

Example utilization models may be based on a cloud service tiered charging scheme of a SLA. In particular, an example charging scheme charges a fixed price for each cache operation (i.e., read and/or write request), based on a location of the data in the cloud storage, where the fixed price increases with each charging tier. Each charging tier has an upper limit to the number of read or write requests that may be made by the consumer, payable at the corresponding fixed price for that tier, within a charging time period defined in the SLA. Accordingly, the fixed price for read and write requests at each charging tier reflects a measure or cost associated with the corresponding resource utilization, and, is therefore used, in the example utilization models, as a basis for determining the measure or cost of cache operations for cache management in order to optimize resource utilization. As discussed above with reference to FIG. 2, the tracking of resource utilization may be performed by Metering and Pricing function 82 of management abstraction layer 80 of a cloud computing environment. In example implementations of the present disclosure, the Metering and Pricing function 82 may provide at least part of the processing functionality of the method of FIG. 4, and communicate tracking and/or pricing information to utilization optimization module 336 of cache management module 334.

Example utilization models may include a user-defined time period and a user-defined maximum threshold for one or more attributes, for each resource or resource type, the attribute depending upon whether the charging basis is: a) the number of read and/or write requests; b) the amount of data transferred, or c) the data rate of data transfer. Thus, in an example which charges per read and/or write request to a resource or resource type, a maximum threshold may be defined for the attribute tot_reads or tot_writes or the sum of both. In an example with charges for the amount of data transferred by read and write requests to a resource or resource type, a maximum threshold may be defined for the attribute tot_data_read or tot_data_write or the sum of both. The maximum threshold for one or more attributes may be based on, or correspond to, the upper limit of a charging tier associated with the attributes. Thus, in one possible example, the utilization model may define a time period of one month, corresponding to the charging time period of the SLA (or a proportion thereof), and a maximum threshold of the sum of the attributes tot_reads and tot_writes corresponding to the upper limit of the number of both read and write requests to a resource or resource type allowed within a charging tier (or a pro-rata proportion thereof) in the cloud service charging scheme of the SLA. As the skilled person will appreciate, a charging tier may have an upper limit in relation to the number of read requests or write requests allowed in the time period separately, or may have an upper limit in relation to the data transferred by read and/or write requests allowed in the time period, as discussed above.

As described above, a typical destage (or eviction) algorithm may use an LRU (least recently used) scheme, whereby the oldest data stored in a LRU portion of the caches is selected for destaging (or eviction) from the cache. When using such a scheme, if new data is merged into the cache at a location already occupied (i.e., the data is being overwritten) a "write cache hit" occurs, thereby suggesting that a host application is likely to be frequently updating that area of the cache. In consequence, data frequently overwritten is moved to the MRU (most recently used) area of the cache. Accordingly, in an example utilization model, the attribute write_bitmap may be set accordingly for that location of the data in the case of overwrites. Similarly, the attribute read_bitmap may be set for that location of the data where reads are frequently requested. As the skilled person will appreciate, the write_bitmap and read_bitmap attributes for each location may be used for determining whether or not to perform a required cache operation for resource optimization, for example according to the example utilization model algorithms set out below. In addition, cache management algorithms may use conventional performance optimization techniques such as cache throttling. Cache throttling refers to the intentional slowing of data transfer of cache operations in order to balance or re-prioritize system resources during high demand, so as to meet performance requirements. Example implementations of the present disclosure may implement cache throttling for optimizing resource utilization, as described further below. For example, it may also be desirable to throttle one or more of: read data rate (tot_data_read or data_read_period) write data rate (tot_data_write or data_write_period); read data operation rate (tot_reads or num_reads_period), and write data operation rate (tot_writes or num_writes_period) in order to optimize resource utilization.

Example utilization models may include the following algorithms for determining whether or not to perform a required cache operation: 1) cache destage (write) operation, and 2) cache eviction (read or write and remove) operation, during the predefined time period. Algorithms 1a) and 2a) are based on the number of read or write requests. Algorithms 1b) and 2b) are based on the amount of data transferred. Algorithms 1c) and 2c) are based on data rate of data transfer, which may include the read rate, the write rate or both. In example implementations, these algorithms may be used in one or more of steps 540, 550 and 570 to 590 of the method 500 of FIG. 5 to determine whether or not to perform a required cache operation, based on the current state of the utilization model. The algorithms are set out below in pseudocode using the attributes defined in Table 1, attribute requirements and thresholds corresponding to tiers of a charging scheme, of a utilization model.

Algorithm 1 (for cache destage operations):

```
Step 1. Calculate cost of the destage operation based on the
charging tier.
Step 2. Calculate current cost of that resource type to read/write that
data.
Step 3. Determine whether cost of the destage operation complies with
current utilization model requirements:
Switch( model)
For case a) per read or write:
    if( proximity write bitmap determines recent write OR
    cost of write or resource is near next tier)
    {
        keep write in cache
        If cache is full - move onto emergency list
    }
    break;
For case b) data_write or data_read or tot(data_write, data_read):
    if( write bitmap determines over-writes OR
    cost of write or resource is near next tier OR
total cost is higher than user desired cost
    {
        keep write in cache
        If cache is full - move onto emergency list
    }
    break;
```

| Algorithm 1 (for cache destage operations): |
|---|
| For case c) write_data_rate:<br>    if( write rate is in next tier and higher than user desired cost)<br>    {<br>        throttle writes to the resource<br>    }<br>    break; |

| Algorithm 2 (for cache eviction operations): |
|---|
| Step 1. Calculate the cost for the data to be read from the cloud, if the host<br>was to read that data again.<br>Step 2. Calculate current cost of that resource type at present to read/write that data.<br>Step 3. Determine whether cost of the destage operation complies with the current utilization model requirements:<br>Switch( model)<br>For case a) per read or write:<br>    if( proximity read bitmap determines recent read OR<br>    cost of read is near next tier)<br>    {<br>        keep read in cache<br>        If cache is full - move onto emergency list<br>    }<br>    break;<br>For case b) data_read or data_write or tot(data_read, data_write)<br>    if( proximity write bitmap indicates recent write OR<br>    cost of read or resource is near next tier):<br>    {<br>        keep read in cache<br>        If cache is full - move onto emergency list<br>    }<br>    break;<br>For case c) read_data_rate:<br>    if( read rate is in next tier and higher than user desired cost)<br>    {<br>        if target read rate for the user is acceptable, throttle reads<br>        to the resource, based on performance targets<br>    }<br>    break; |

As the skilled person will appreciate, the above example algorithms may determine whether the respective read, write and/or resource costs of a required cache operation would lead to utilization "near" a next charging tier. Whether a cost is near a next charging tier may be determined based on a quantitatively defined margin with respect to the upper limit or threshold of the current charging tier, which margin may change over the time period. In example implementations, a cost may be considered to be near a next charging tier if a combined cost of the required cache operation and previous cache operations in the current time period exceeds a threshold based on the upper limit of the charging tier. As the skilled person will further appreciate, the above example algorithms may be varied according to user requirements. If the relevant algorithm moves the data onto the emergency list, as in step 590 of the method 500 of FIG. 5, the method may additionally provide a flag to the user that the emergency list is used. The user may then reconsider migrating data from that resource. Other schemes could use the attribute tot_data_stored to allow the user to recognise a bias of where the data is stored and produce a report on the most resource utilizing or costly resources. From that, the consumer could determine whether it is better to move a resource onto cheaper storage, and the utilization model may be updated accordingly.

As the skilled person will appreciate, example utilization models do not need to be based on or use a data storage service provider's charging model. Rather, the utilization model may be developed and defined according to technical requirements for optimal resource utilization. These technical requirements may relate to the optimization of power consumption, bandwidth utilization, utilization of processing and storage resources, and may take into account data traffic, hardware lifetime and maintenance etc. The skilled person will appreciate, however, that a charging model of a data storage service provider typically reflects at least some of these technical considerations. In addition, whilst the above algorithms aim to prevent utilization that exceeds a particular charging tier in a predefined time period, and thus minimize resource utilization in the short term, the utilization model equally may be formulated to optimize the utilization of at least some of these resources over the long term.

Whilst the above description discloses determining a measure of resource utilization associated with a cache operation as a "cost", the term "cost" is not intended to be limited to financial costs associated with resource utilization. Rather, the term "cost" is intended to include a measure of the technical costs and penalties associated with resource utilization, which may be used for optimization in accordance with technical requirements, as discussed above.

In example implementations of the present disclosure, cache management module 334 may implement a prefetch algorithm, which determines whether a host application is likely to read data from a region of data storage system, and to read it into cache memory before the host application requests it. This results in reduced response time as the data is already available in the cache and therefore does not suffer the latency from the resource. Cloud storage typically has higher latency, due to the amount of time it takes to transfer the data over the cloud network. In this case, prefetching in the cache may be of particular benefit, and may be optimized, for example by the utilization optimization module 336 using the method of FIG. 5. In this case, an algorithm for determining whether to perform the required read cache operation may be based on whether the tot_cost_read attribute is near a threshold. However, in some workloads, prefetching may read data into cache memory but the host application does not read it in time, thereby causing a "prefetch miss". This results in wasted cache operations, including utilization of computing resources in the cloud data storage environment. Accordingly, the above described utilization model may additionally track an attribute associated with prefetch misses and a resource or resource type. The cache management module 334 may be operated to disable the prefetching algorithm, if a counter of prefetch misses in the current utilization model exceeds a threshold, for a predetermined time interval, after which prefetching may be reenabled.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer implemented method comprising:
   determining that a cache operation relating to a transfer of a data between a cache memory and a data storage system is required;
   receiving a current state of a utilization model, the utilization model comprising requirements for utilization of resources of the data storage system over a predefined time period and a predefined threshold for a cumulative cost of resource utilization associated with cache operations over the predefined time period, the current state indicating a current cost of resource utilization associated with individual cache operations in a current predefined time period and a cumulative cost of resource utilization associated with cache operations that have been performed in the current predefined time period;
   combining a current cost of resource utilization associated with the cache operation with the cumulative cost of resource utilization associated with previous cache operations that have been performed in the current time period;
   comparing the combined cost of resource utilization with the predefined threshold;
   comparing values of attributes of the cache operation with corresponding values of attributes of the current state of the utilization model, wherein the attributes include one or more of: read bitmap, write bitmap, proximity read bitmap, and proximity write bitmap;
   in response to determining that the utilization requirements of the current state of the utilization model are met, and that the combined cost of resource utilization is below the predefined threshold, and that the values of the attributes of the cache operation meet the requirements of the corresponding values of the attributes of the current state of the utilization model, performing the cache operation;
   in response to determining that the utilization requirements of the current state of the utilization model are not met or that the combined cost of resource utilization is below the predefined threshold:
      if the cache operation is a cache write operation, determining whether the cache memory is full; and
      in response to determining that the cache memory is not full, maintaining the data associated with the cache operation in the cache memory; and
      in response to determining that the cache memory is full, managing the cache operation according to an emergency cache management process.

2. The method of claim 1, further comprising:
   in response to determining that the cache operation should be performed, performing the cache operation.

3. The method of claim 1, wherein the utilization model comprises an algorithm for determining whether to perform a cache operation based on the type of cache operation and utilization requirements associated with the type of cache operation.

4. The method of claim 1, wherein, in response to determining that the cache operation should be performed, the method further comprises:
   sending feedback data associated with the cache operation for updating the current state of the utilization model.

5. The method of claim 1, wherein the utilization model comprises a plurality of attributes relating to resource utilization by cache operations, and a predefined threshold relating to at least one of the plurality of attributes for the predefined time period, the method further comprising:
   comparing an attribute relating to resource utilization associated with the cache operation with an attribute or a predefined threshold relating to an attribute of the utilization model, and
   determining whether to perform the cache operation, based on the comparison.

6. The method of claim 1, wherein, prior to receiving a current state of a utilization model, the method further comprises:
   monitoring cache operations relating to the transfer of data between the cache memory and the data storage system from a start of the current predefined time period, and
   updating the utilization model to a current state, based on the monitoring.

7. A system comprising:
   a cache memory;
   a processing unit operated to manage cache operations of the cache memory, wherein the processing unit is operated to:
   determine that a cache operation relating to a transfer of a data between the cache memory and a data storage system is required;
   receive a current state of a utilization model, the utilization model comprising requirements for utilization of resources of the data storage system over a predefined time period and a predefined threshold for a cumulative cost of resource utilization associated with cache operations over the predefined time period, the current state indicating a current cost of resource utilization associated with individual cache operations in a current predefined time period and a cumulative cost of resource utilization associated with cache operations that have been performed in the current predefined time period;
   combine a current cost of resource utilization associated with the cache operation with the cumulative cost of resource utilization associated with previous cache operations that have been performed in the current time period;
   compare the combined cost of resource utilization with the predefined threshold;
   compare values of attributes of the cache operation with corresponding values of attributes of the current state of the utilization model, wherein the attributes include one or more of: read bitmap, write bitmap, proximity read bitmap, and proximity write bitmap;
   in response to determining that the utilization requirements of the current state of the utilization model are met, and that the combined cost of resource utilization is below the predefined threshold, and that the values of the attributes of the cache operation meet the requirements of the corresponding values of the attributes of the current state of the utilization model, perform the cache operation;
   in response to determining that the utilization requirements of the current state of the utilization model are not met or that the combined cost of resource utilization is below the predefined threshold:
      if the cache operation is a cache write operation, determine whether the cache memory is full;
      if the cache memory is not full, maintain the data associated with the cache operation in the cache memory; and
      if the cache memory is full, control the cache memory to manage the cache operation according to an emergency cache management process.

8. The system of claim 7, wherein the processing unit is further operated, in response to determining that the cache operation should be performed, to control the cache memory to perform the cache operation.

9. The system of claim 7, further comprising:
a memory unit comprising a processing module, wherein the processing module includes an algorithm, executable by the processing unit, for determining whether to perform a cache operation, based on the type of cache operation and utilization requirements associated with the type of cache operation.

10. The system of claim 7, wherein the processing unit is further operated, in response to determining that the cache operation should be performed, to:
send feedback data associated with the cache operation for updating the current state of the utilization model.

11. The system of claim 7, wherein the utilization model comprises a plurality of attributes relating to resource utilization by cache operations and a predefined threshold relating to at least one of the plurality of attributes for the predefined time period, and wherein the processing unit is further operated to:
compare an attribute relating to the resource utilization associated with the cache operation to an attribute or a predefined threshold relating to an attribute of the utilization model; and
determine whether to perform the cache operation, based on the comparison.

12. The system of claim 7, wherein the processing unit is further operated, prior to receiving a current state of a utilization model, to:
monitor cache operations relating to the transfer of data between the cache memory and the data storage system from a start of the current predefined time period; and
update the utilization model to a current state, based on the monitoring.

13. The system of claim 7, wherein a memory unit is operated to store the utilization model.

* * * * *